United States Patent
Schnitzer et al.

(10) Patent No.: US 12,402,766 B2
(45) Date of Patent: Sep. 2, 2025

(54) METHOD FOR OPERATING A MOBILE, SELF-DRIVING APPLIANCE

(71) Applicant: BSH Hausgeräte GmbH, Munich (DE)

(72) Inventors: Frank Schnitzer, Bad Neustadt (DE); Stefan Hassfurter, Maroldsweisach (DE); Katja Gnielka, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 191 days.

(21) Appl. No.: 18/356,520

(22) Filed: Jul. 21, 2023

(65) Prior Publication Data
US 2024/0023775 A1  Jan. 25, 2024

(30) Foreign Application Priority Data
Jul. 21, 2022 (DE) .................... 10 2022 207 500.5

(51) Int. Cl.
*A47L 9/28* (2006.01)
*G01S 17/88* (2006.01)

(52) U.S. Cl.
CPC ............ *A47L 9/2805* (2013.01); *G01S 17/88* (2013.01)

(58) Field of Classification Search
CPC .... A47L 9/2805; A47L 2201/04; A47L 9/106; A47L 9/2836; A47L 2201/00; A47L 9/28; A47L 11/00; A47L 5/12; A47L 9/00; A47L 9/10; A47L 11/40; A47L 11/4011; A47L 11/4013; G01S 17/88; G01S 7/4813; G01S 17/08
See application file for complete search history.

(56) References Cited

U.S. PATENT DOCUMENTS

| | | | |
|---|---|---|---|
| 10,423,165 | B2 * | 9/2019 | Menard ............... G05D 1/0276 |
| 2017/0332864 | A1 * | 11/2017 | Nam ..................... A47L 9/122 |
| 2018/0116478 | A1 * | 5/2018 | Lewis .................... A47L 9/009 |
| 2018/0299899 | A1 | 10/2018 | Suvarna et al. |
| 2022/0338702 | A1 * | 10/2022 | Wang .................... A47L 11/282 |
| 2023/0023807 | A1 * | 1/2023 | Heinla ............... G05B 19/4155 |

FOREIGN PATENT DOCUMENTS

| | | |
|---|---|---|
| CN | 109276193 A | 1/2019 |
| DE | 10357635 A1 | 7/2005 |
| JP | 2006095106 A | 4/2006 |
| JP | 2021137153 A | 9/2021 |

* cited by examiner

*Primary Examiner* — Bao Long T Nguyen
(74) *Attorney, Agent, or Firm* — Laurence A. Greenberg; Werner H. Stemer; Ralph E. Locher

(57) ABSTRACT

A method for operating a mobile, self-driving appliance, in particular a floor cleaning appliance, such as a vacuuming robot and/or sweeping robot and/or mopping robot, uses a detection facility provided for navigation to determine whether a cover element, which is disposed on an appliance housing of the mobile, self-driving appliance, is open or closed. When the cover element is open, the mobile, self-driving appliance performs a driving maneuver for independently closing the cover element.

11 Claims, 4 Drawing Sheets

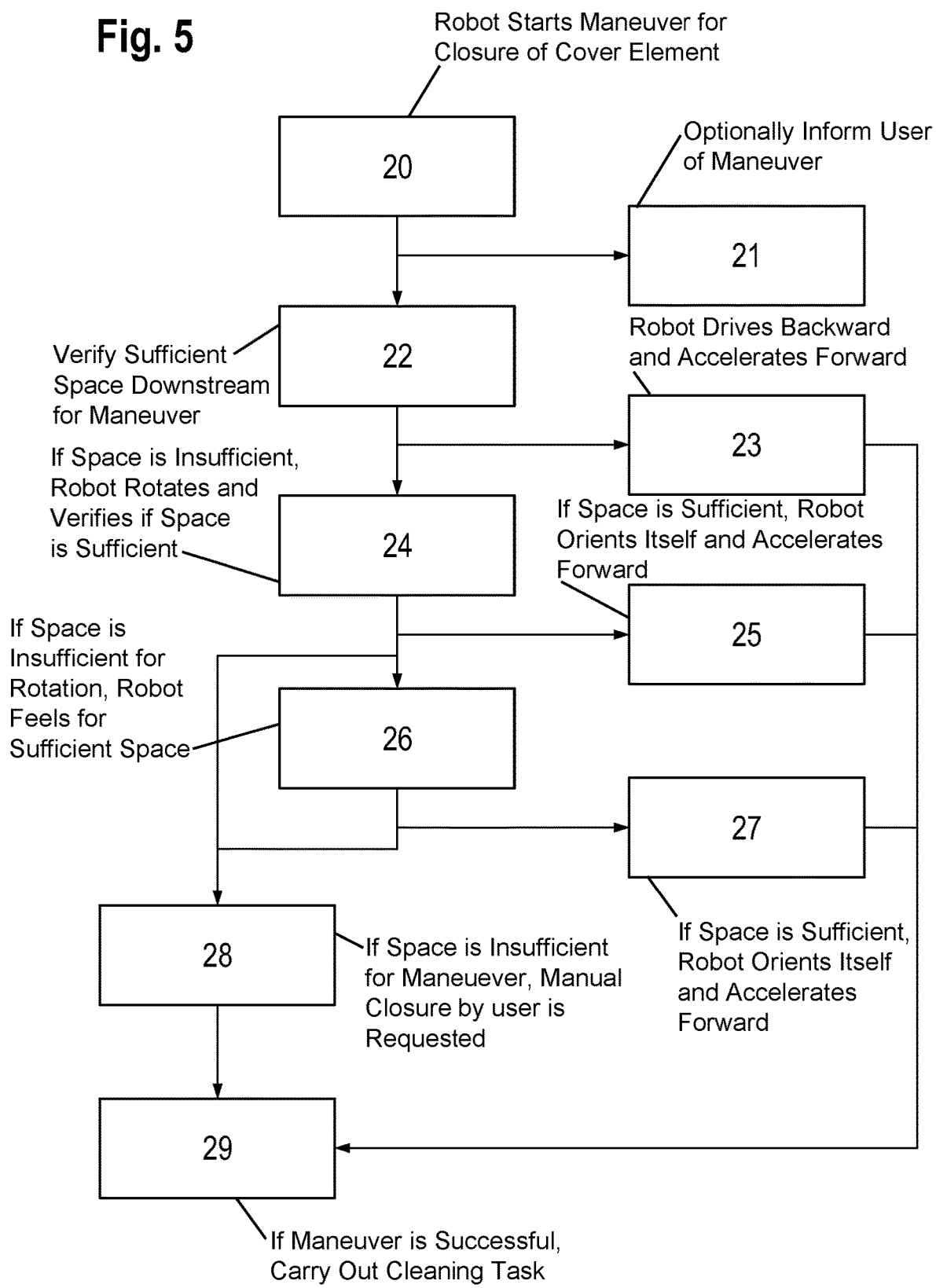

METHOD FOR OPERATING A MOBILE, SELF-DRIVING APPLIANCE

CROSS-REFERENCE TO RELATED APPLICATION

This application claims the priority, under 35 U.S.C. § 119, of German Patent Application DE 10 2022 207 500.5, filed Jul. 21, 2022; the prior application is herewith incorporated by reference in its entirety.

FIELD AND BACKGROUND OF THE INVENTION

The invention relates to a method for operating a mobile, self-driving appliance, in particular a floor cleaning appliance such as a vacuuming robot and/or sweeping robot, having a detection facility.

Mobile, self-driving appliances, such as for example vacuuming robots, have the task of autonomously cleaning as much as possible of an entire floor surface. Generally, such vacuuming robots are provided with a dust collection container in which the dirt and dust which has been vacuumed up is collected. With such a dust collection container, it is absolutely necessary that the user regularly empties the dust collection container, so that the vacuuming robot can operate, or vacuum up the relevant dirt, at full suction power. To that end, the vacuuming robot has a cover element on its upper face above the dust collection container. In order to remove the dust collection container from the vacuuming robot and to be able to empty it, a user opens the cover element by moving the cover element into a substantially vertical position relative to the vacuuming robot in order to permit access to the dust collection container in that manner. After the dust collection container has been emptied and/or cleaned, it is re-inserted into the vacuuming robot by the user and the cover element is closed, by flapping the cover element down into its substantially horizontal position.

A drawback in that case is that after the dust collection container has been inserted, the user can forget to close the cover element again. The open cover element significantly restricts a field of view of a detection facility, however, and prevents obstacles upstream or downstream of the vacuuming robot from being able to be identified and detected. That results in an increase in the potential risk of navigation errors and collisions with undetected obstacles.

Known solutions include sensors which detect the open position of the cover element and inform the user, for example, by using a voice output. As soon as the vacuuming robot identifies an open cover element by using those sensors, the vacuuming robot no longer starts the cleaning passes but waits for the user to intervene in order to allow the cover element to be manually closed.

SUMMARY OF THE INVENTION

It is accordingly an object of the invention to provide a method for operating a mobile, self-driving appliance, which overcomes the hereinafore-mentioned disadvantages of the heretofore-known methods of this general type, which as far as possible is autonomous and, in particular independent, and which requires as little intervention as possible by the user.

With the foregoing and other objects in view there is provided, in accordance with the invention, a method for operating a mobile, self-driving appliance, in particular a floor cleaning appliance, such as a vacuuming and/or sweeping and/or mopping robot for the autonomous treatment of floor surfaces, in which a detection facility provided for navigation is used to determine whether a cover element, disposed on an appliance housing of the mobile, self-driving appliance, is open or closed, and when the cover element is open the mobile, self-driving appliance performs a driving maneuver for independently closing the cover element.

Advantageous embodiments and developments form the subject of the dependent claims.

In the present case, the detection facility which is provided for the navigation is thus also used to determine a position of the cover element in order to perform the designated steps according to the result of the determination. An additional sensor system for determining the position of the cover element is advantageously not required. Due to this sensor system being dispensed with, this advantageously has a positive effect on the manufacturing cost, the complexity of the system and the assembly time of the mobile, self-driving appliance.

The mobile, self-driving appliance thus does not use an extra built-in sensor in order to establish whether the cover element above the dust collection container has been left open by the user, but rather uses the detection facility which in any case is built in. The mobile, self-driving appliance, therefore, can independently detect an open cover element without having to use dedicated sensors.

If an open cover element is identified by using the detection facility, the mobile, self-driving appliance performs independently, and in particular automatically, a driving maneuver by which an attempt is made to close the cover element without the intervention of the user. In particular, the drives of the mobile, self-driving appliance are used and the mobile, self-driving appliance is thus able to close the cover element unassisted. To this end, for example, a rapid acceleration maneuver is used. In addition to simply detecting the open cover element, the appliance is thus also able to close this cover element independently and autonomously without the need for intervention by the user.

A mobile, self-driving appliance, in particular, is a floor cleaning appliance, for example a cleaning appliance which, in particular, autonomously treats floor surfaces in the household sector. These include, among other things, vacuuming, mopping and/or sweeping robots, such as for example robotic vacuum cleaners. These appliances preferably operate during operation (cleaning mode) without any user intervention, or with as little as possible user intervention. For example, the appliance automatically travels into a predetermined space in order to clean the floor according to a predetermined and programmed-in method strategy.

The floor surface to be treated is to be understood to mean any spatial area to be cleaned. This also includes, among other things, sub-regions of individual rooms, individual areas of an apartment, individual rooms of an apartment and/or the entire floor surface of the whole apartment or the living space.

In order to be able to take into account any individual features of the environment, preferably an exploration pass is carried out by the mobile, self-driving appliance. An exploration pass is understood to mean, in particular, a reconnaissance pass which is suitable for investigating a floor surface to be treated for obstacles, spatial division, and the like. The purpose of an exploration pass, in particular, is to be able to assess and/or to represent conditions of the floor treatment region to be treated.

After the exploration pass, the mobile, self-driving appliance identifies its environment and can forward this to the user in the form of a map of the environment, for example in an app on a mobile device. In the map of the environment, the possibility can be provided to the user of interacting with the mobile, self-driving appliance. The user can advantageously examine, and if required change and/or adapt, information in the map of the environment.

A map of the environment is understood to mean, in particular, any map which is suitable for representing the environment of the floor treatment region with all its obstacles and objects. For example, the map of the environment shows the floor treatment region with the furniture and walls contained therein in sketch form.

Obstacles are understood to mean any objects and/or items which are disposed in a floor treatment region, for example which are lying or standing therein, and affect, in particular hinder and/or disrupt, the treatment by the mobile, self-driving appliance, such as for example furniture, walls, curtains, carpets, and the like.

The map of the environment including the obstacles is preferably represented in the app on a portable additional device. This serves, in particular, for the visualization of a possible interaction for the user.

An additional device is to be understood to mean in the present case, in particular, any device which is portable by a user, which is disposed outside the mobile, self-driving appliance, in particular externally and/or differentiated from the mobile, self-driving appliance, and which is suitable for displaying, providing, transmitting and/or transferring data, such as for example a cell phone, a smartphone, a tablet and/or a computer or laptop.

In particular, the app, in particular a cleaning app, is installed on the portable additional device, the app serving for the communication of the mobile, self-driving appliance with the additional device, and in particular permitting a visualization of the floor treatment region, i.e. the living space to be cleaned or the apartment or living area to be cleaned. The app preferably displays to the user the region to be cleaned as a map of the environment and any obstacles.

A dust collection container is, in particular, a container which is suitable for collecting, receiving, holding and/or differentiating dust. For example, a dust collection container is a container or a box in which in operating mode the dust which has been vacuumed up is collected, or which is filled with the dust which has been vacuumed up during operation until a maximum filling level is reached. The maximum filling level can be output to the user as a signal so that the user can remove and, in particular, empty the dust collection container.

An appliance housing is to be understood to mean, in particular, the outer housing of the appliance which seals the appliance toward the outside. The inner workings of the appliance are thus located in the interior of the appliance housing. The detection facility protrudes over the appliance housing, for example in the vertical direction, in particular in the z-direction. For example, the detection facility is disposed on an upper face in a central region of the appliance housing.

A detection facility is understood to mean any facility which is preferably suitable for detecting obstacles in a reliable manner. This detection facility is preferably sensor-based, laser-based and/or camera-based. Preferably, the detection facility is a lidar sensor and/or a laser tower which detects or scans its environment in a horizontal plane through a 360° rotation. In particular measuring beams, in particular laser beams, which are used for the distance measurement are emitted at regular intervals from the detection facility. The rotation of the detection facility takes place about an axis of rotation, in particular about a z-axis, relative to the appliance housing and is carried out by a motor.

A horizontal plane is understood to mean, in particular, any plane which runs parallel to a floor surface and in the horizontal and/or two-dimensional direction. In particular, the horizontal plane runs parallel to the upper face of the appliance housing. Preferably, the horizontal plane is located at a short distance, i.e. just above the upper face of the appliance housing.

A cover element is understood to mean, in particular, a part of the appliance housing which can be in an open and a closed state and which, in particular, covers the inner workings of the mobile, self-driving appliance. For example, the cover element covers the dust collection container and permits the user to remove the dust collection container from the appliance or to insert the dust collection container into the appliance. The cover element is fastened to the adjacent appliance housing, for example, by hinges, so that the cover element is movable from a horizontal position into a vertical position for the opening and closing. "Horizontal" and "vertical" are to be understood to mean in this case in relation to the upper face of the appliance housing.

A driving maneuver is to be understood to mean, in particular, any planned driving movement which contains as a target the independent closure of the cover element. This can be, for example, an acceleration movement, a braking movement and/or a rotational movement. The driving maneuver is preferably carried out suddenly, abruptly or rapidly in order to initiate and to assist a closing movement of the cover element.

In an advantageous embodiment, the driving maneuver is carried out independently of the user. In particular, no user intervention is required. When an open cover element is detected, the driving maneuver is carried out automatically by the appliance without a user having to provide a command and/or permission therefor. The appliance thus operates unassisted in this case.

In a further advantageous embodiment, the cover element is a cover flap above a dust collection container to be emptied. The appliance thus detects by using the detection facility, which is present for the navigation and obstacle identification, whether the cover flap above the dust collection container has been left open by the user. Without intervention by the user, the appliance attempts to close this flap by using the predetermined driving maneuver, whereby the detection facility again has a full field of view available for the navigation and obstacle identification.

In a further advantageous embodiment, the detection facility is a lidar sensor. This lidar sensor is positioned on the appliance in such a way that the lidar sensor scans a horizontal plane just above the appliance, for example a plane ca. 10 mm above the upper face of the appliance housing. The cover element above the dust collection container of the appliance, in particular, is disposed centrally or in the middle on the appliance and thus is also located in the region which is detected by the lidar sensor. Measuring beams of the lidar sensor cannot penetrate the cover element. An open cover element thus hinders the scanning plane of the lidar sensor at the front, whereby although the appliance in principle can identify and detect the cover element it does not identify obstacles located downstream of the cover element.

In particular, the lidar sensor records measured values in a range of, for example, 1 cm distance and with a resolution of, for example, 1°. For a cover element having a length of 20 to 25 cm, at a distance of approximately 20 cm sufficient measuring points are produced, in particular 50 measuring points or more, in order to detect reliably the cover element and to be able to differentiate it from other obstacles or objects.

Preferably, before the driving maneuver, it has to be ensured that the lidar sensor has detected the cover element and not another object which the user has positioned, for example, on the appliance. After the detection of at least one obstacle in the region of the appliance housing, a position of the detected obstacle in relation to the cover element is also determined. It is thus verified whether measuring points which are clearly located in the region of the appliance perimeter, and thus not in the surrounding environment of the appliance, can be assigned to the position of the cover element, in particular relative to the distance, length and relative position.

In a further advantageous embodiment, when determining the position in relation to the cover element a tolerance range is taken into consideration, in particular around the position of the open cover element. The tolerance range, in particular, is introduced in order to consider a measuring accuracy of, for example, +/−1 cm with measuring distances of less than 1 m from the lidar sensor. Only measuring points within the tolerance range are assigned to the cover element. If sufficient measuring points can be established, an open cover element is assumed. In particular, measuring points of the detection facility within the tolerance range are assigned to the cover element and outside the tolerance range to other obstacles.

A modeling of the measured edge by using methods of the smallest squared deviation, for example a least squares fitting to a line, can be additionally used for identifying the cover element as such. Alternatively or additionally, the measuring points can be verified over time. For example, further measuring points of the detection facility are present after approximately 0.2 seconds. If these measuring points are similar to the previously determined measuring points, it is assumed that an open cover element has been detected.

From all lidar measuring points or from at least a defined selection, which face in the direction of the cover element, in particular those which have a measured value on the other side of the appliance perimeter, are supplied to the navigation algorithms in order to be able to be used therein for the localization and/or mapping of the environment. The measured values located within the appliance perimeter are verified as to whether they are located in the defined tolerance range around the open cover element. Measuring points which are not located within the tolerance range are rejected, since no item should be present in these regions, or are used in order to find out whether the user has positioned an object on the appliance.

In a further advantageous embodiment, a further sensor is present which determines whether a dust collection container is inserted or not in the mobile, self-driving appliance. It is possible that the user removes from the appliance the dust collection container of the appliance and empties it during the execution of a cleaning task. If no dust collection container is identified in the appliance, for example by using a microswitch or a reed contact, it is not expedient that the appliance performs an action, in particular the driving maneuver, in spite of the detected open cover element. Only if the dust collection container is detected in the appliance, and the cover element is open at the same time, is the performing of the cleaning task actually hindered and the appliance undertakes countermeasures, in particular the designated driving maneuver.

In a further advantageous embodiment, a user is informed visually and/or through audio output about an open cover element. In particular, in this case a manual closing is requested, for example through a notification in the app or by a voice output by using a loudspeaker.

In a further advantageous embodiment, the driving maneuver includes an acceleration maneuver by which a momentum is introduced into the cover element so that it falls shut. In particular, by using the drives the appliance is able to perform special driving maneuvers, for example a rapid acceleration maneuver, by which the momentum is introduced into the cover element so that it falls shut by itself.

In a further advantageous embodiment, a weight is disposed in an upper region of the cover element. In particular, during the acceleration or during the driving maneuver, the momentum on the cover element is increased by the weight, whereby in particular this advantageously results in the cover element falling shut in a reliable manner.

During the driving maneuver, in particular, it is advantageous that the appliance has sufficient space for the designated driving maneuver and, for example, no obstacles are present in its environment. In order to ensure this, the appliance verifies its environment with the remaining field of view of the detection facility. In particular, the mobile, self-driving appliance performs a detection of the environment before the driving maneuver in order to ensure that sufficient space is available for the driving maneuver. If it is not possible to drive the appliance backwards or rotate the appliance, for example, a bumper of the appliance can be used as a further sensor at the front in order to test whether sufficient free space is available in the immediate environment for the driving maneuver. If no space is present for a corresponding driving maneuver, for example, the user can call for help and/or be informed.

Other features which are considered as characteristic for the invention are set forth in the appended claims.

Although the invention is illustrated and described herein as embodied in a method for operating a mobile, self-driving appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 4 and 5 are flow diagrams each relating to an exemplary embodiment of a method according to the invention for the operation of a mobile, self-driving appliance.

DETAILED DESCRIPTION OF THE INVENTION

Figure 1A:
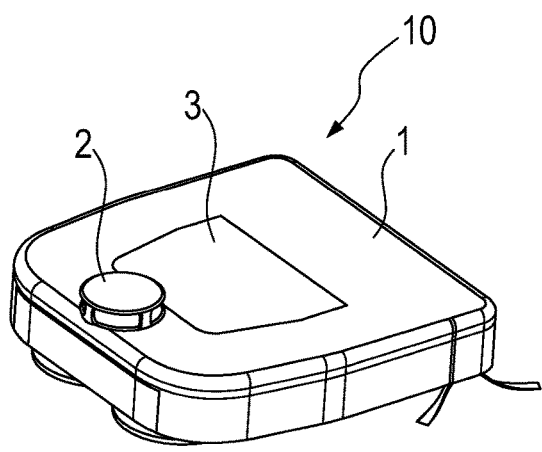
FIGS. 1a and 1c are diagrammatic, perspective views each showing an exemplary embodiment of a mobile, self-driving appliance for the operation of a method according to the invention.
Figure 1B:
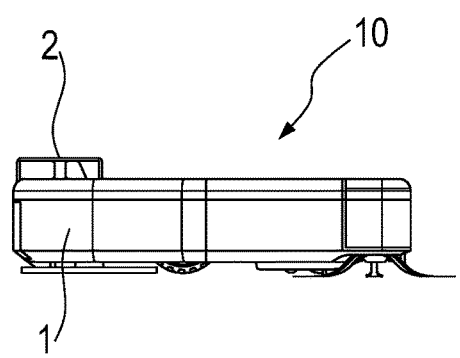
FIGS. 1b, 1d, 2a and 2c are side-elevational views each showing an exemplary embodiment of a mobile, self-driving appliance for the operation of a method according to the invention.
Figure 1C:
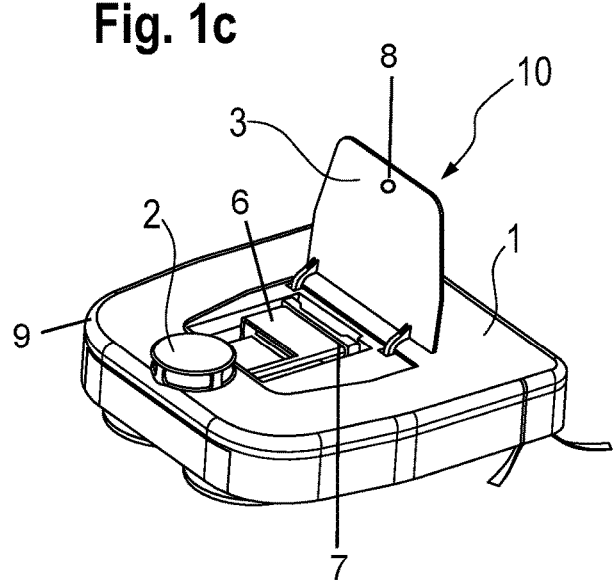
Figure 1D:
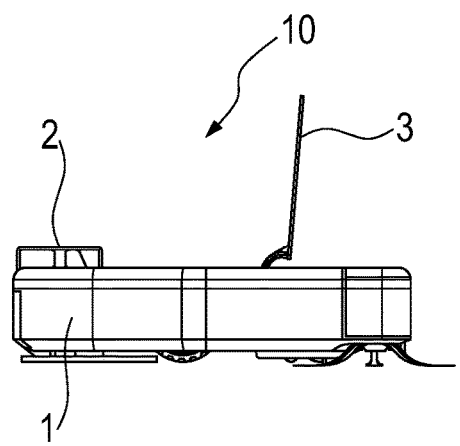

Referring now to the figures of the drawings in detail and first, particularly, to FIGS. 1a-1d thereof, there is seen an exemplary embodiment of a mobile, self-driving appliance 10 in top-perspective and side-elevational views. The appliance 10 is a vacuuming robot which has an appliance housing 1 and a detection facility 2. The detection facility 2 is a lidar sensor which is attached to an upper face of the housing 1 in a central rear region. The detection facility 2 scans a horizontal plane parallel to the upper face of the housing 1 for the navigation of the appliance 10. A cover element 3, in particular a cover plate, which can be folded from a closed position in the upper face of the housing 1 into an open position, is located on the upper face of the appliance. The cover plate, in particular, can be folded up. To this end, the cover plate is fastened on one side to the housing 1, for example by hinges. FIGS. 1a, 1b show the appliance 10 with the closed cover element 3 and FIGS. 1c, 1d show the appliance 10 with the open cover element 3.

The cover element 3 is disposed above a dust collection container, in particular a dust box 6. In order to be able to remove the dust box 6 from the appliance 10 and empty it, a user opens the cover element 3 by moving it into a substantially vertical position and in this manner permitting access to the dust box 6 (FIGS. 1c, 1d). After the dust box 6 has been emptied and/or cleaned, the user then places it back in the appliance 10 and closes the cover element 3, by folding the cover element down into its horizontal position (FIGS. 1a, 1b).

If the cover element 3 is in its open position, this restricts the field of view of the lidar sensor 2 and prevents, in particular, objects and obstacles upstream of the vacuuming robot from being able to be identified. This results in an increase in the potential risk of navigation errors and collisions with obstacles.

Figure 2A:
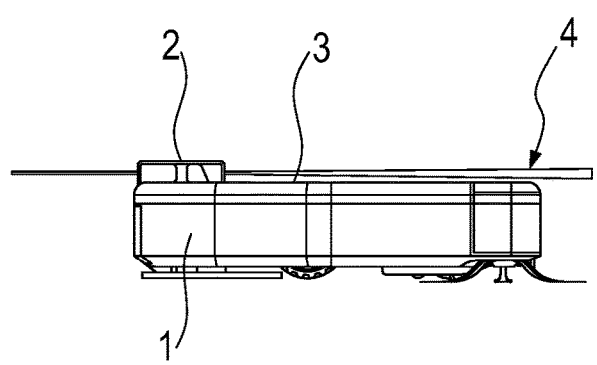
Figure 2B:
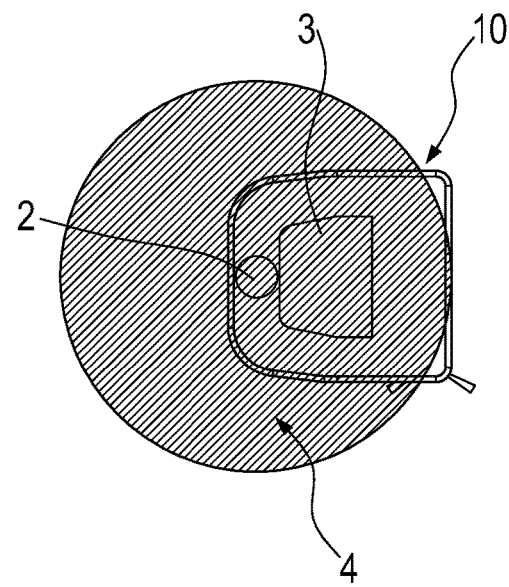
FIGS. 2b, 2d and 3 are top-plan views each showing an exemplary embodiment of a mobile, self-driving appliance for the operation of a method according to the invention.

FIGS. 2a, 2b show the detection facility 2 during operation when the cover element 3 is closed. The lidar sensor outputs measuring beams 4 in a 360° field of view. The measuring beams in this case are emitted in the horizontal plane parallel to the upper face of the appliance 10. When the cover element 3 is closed, a detection is possible in the full 360° field of view of the lidar sensor. There is no visual obstruction due to the cover element 3.

Figure 2C:
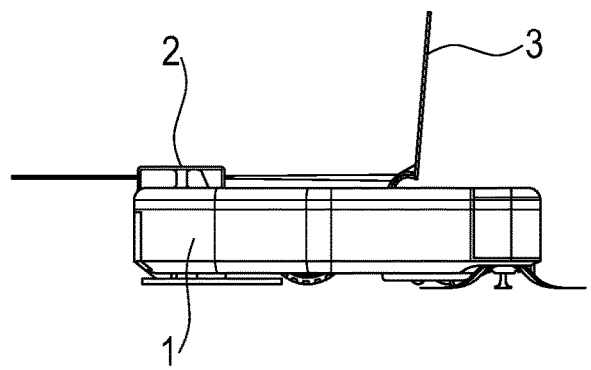
Figure 2D:
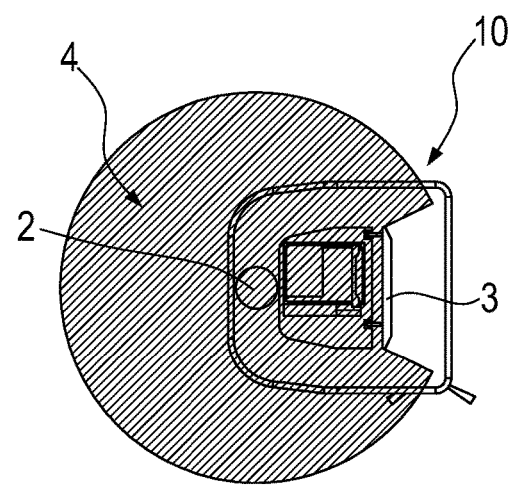

If the cover element 3 is open, however, this prevents or reduces the field of view of the lidar sensor in the region of the cover element 3. This is shown in FIGS. 2c, 2d. When the cover element 3 is open, this cover element passes through the measuring beams of the lidar sensor and blocks these measuring beams, so that a detection downstream of the cover element 3 is prevented. Thus it is not possible to drive the vacuuming robot with active collision avoidance.

In the present case, the lidar sensor is used in addition to the navigation to detect an open cover element 3. When the cover element is open, the appliance 10 initiates a method in which the vacuuming robot attempts to close the cover element unassisted, without intervention from outside, by a suitable driving maneuver and thus to reinstate its full functionality relative to the detection range of the lidar sensor. The vacuuming robot thus detects the open cover element without a dedicated sensor and then independently initiates a procedure for the closure.

Figure 3:
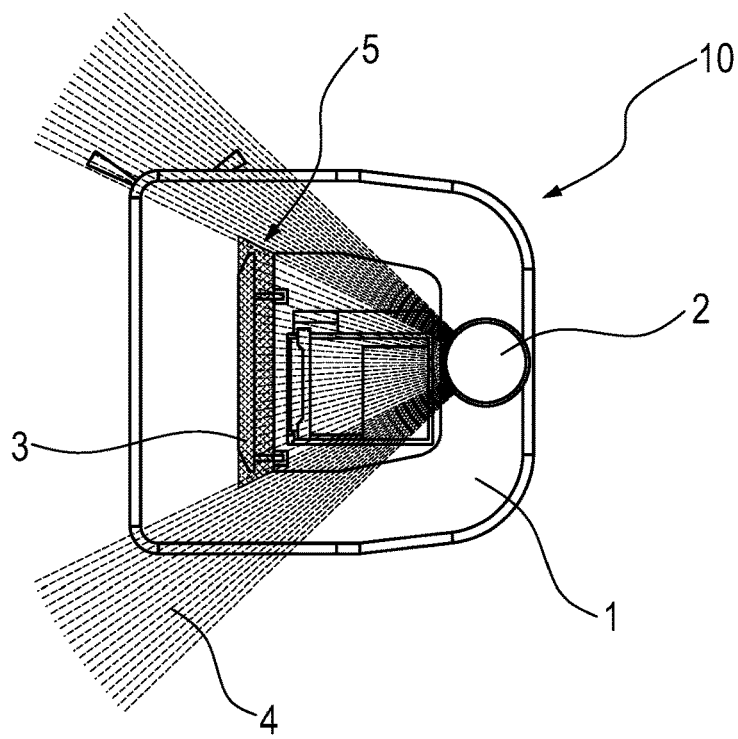

In order to ensure that it is the cover element which is detected as being open by the lidar sensor, rather than a different object which, for example, has been placed by the user on the appliance housing of the vacuuming robot, the appliance verifies whether detected measuring points, which are in the region of the appliance perimeter and thus not in the surrounding environment, can be assigned to the position of the cover element in terms of distance, length and position. The measuring accuracy of, for example, +/−1 cm is considered in this case at measuring distances of <1 m from the lidar sensor, by a tolerance range 5 being established around the position of the open cover element 3. Only the measuring points within the tolerance range 5 are assigned from the appliance 10 to the cover element 3. If sufficient measuring points can be established, an open cover element is assumed. This is shown graphically in FIG. 3.

A modeling of the measured edge of the cover element 3 by using methods of the smallest squared deviation (least squares fitting to a line) can assist the reliable identification of the cover element. In order to ensure the accuracy of the detection, the result can also be verified over time. For example, further measured values may be present after a specific time, for example 0.2 seconds. If these measured values are similar to the previously determined data, it is to be assumed therefrom that an open cover element is present.

The lidar sensor detects measured values on the other side of the appliance perimeter. These measured values are supplied to the navigation algorithms in order to be used therein for localization and/or mapping. The measured values within the appliance perimeter are then verified as to whether they are within the defined tolerance range around the open cover element. Measured points which are not within the tolerance range are rejected or used in order to verify whether an object is positioned on the appliance. It also has to be verified whether the dust collection container 6 is inserted in the appliance or not. To this end, a microswitch, a reed contact or a light barrier, for example, can be used.

Figure 4:
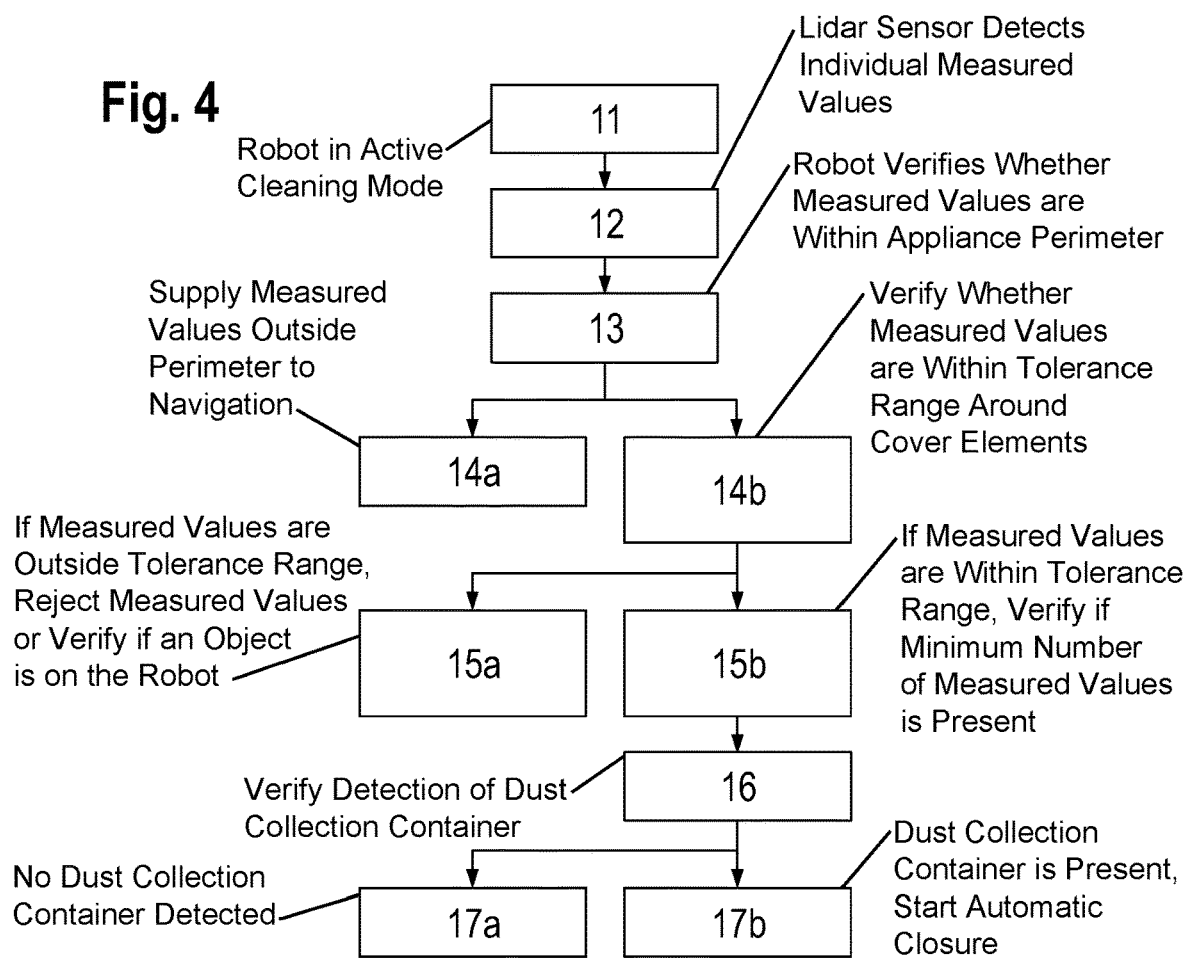

FIG. 4 shows such a flow diagram for verifying the vacuuming robot as to whether an open cover element has been identified. In the first Step 11 the vacuuming robot is in the active cleaning mode. Individual measured values are detected by the lidar sensor (Step 12). Then the vacuuming robot verifies whether the respective measured values are within the appliance perimeter (Step 13). If these measured values are outside, the detected measured values are supplied to the navigation (Step 14a). If the measured values are within the appliance perimeter, however, in Step 14b it is verified whether the measured values are within the tolerance range around the cover element. If these measured values are outside the tolerance range, the corresponding measured values are rejected or it is verified whether an object is located on the vacuuming robot (Step 15a). If the measured values are within the tolerance range, in Step 15b it is verified whether a minimum number of measured values is present for the detection of the cover element. Then it is verified whether the dust collection container 6 can be detected by using an associated further sensor 7 (Step 16). If no dust collection container 6 is detected, no further action is performed (Step 17a). If a dust collection container 6 can be detected, the procedure for the automatic closure of the cover element (Step 17b) is started.

The procedure for the automatic closure contains, in particular, a special driving maneuver of the vacuuming robot, for example a rapid acceleration maneuver, by using the drives, whereby a momentum is introduced into the cover element so that it falls shut. In order to assist this falling shut a weight 8 can be installed in the uppermost region of the cover element, so that the momentum on the cover element is increased during acceleration. Sufficient space is required for the driving maneuver in the environment of the vacuuming robot. In particular, no obstacles should be in the vicinity of the vacuuming robot. To this end, the appliance verifies its environment with the remaining field of view of the lidar sensor. If it is not possible to drive the vacuuming robot backwards or rotate it, a bumper can be used as a remaining sensor at the front, in order to test whether sufficient free space is available in the immediate environment.

If the appliance during its verification arrives at the point that insufficient space is present for a corresponding driving maneuver, the assistance of the user is summoned, by requesting a manual closure, so that the cleaning task can be continued and successfully terminated.

In FIG. 5 a flow diagram for the procedure of the independent closure of an open cover element is shown. In Step 20 the vacuuming robot starts the maneuver for the independent closure of the cover element. Optionally, in Step 21 the appliance additionally informs the user through the use of a light or loudspeaker 9 that the maneuver for closing the cover element is performed or has to be performed. In Step 22, the appliance verifies whether its environment downstream of the vacuuming robot has sufficient space for the maneuver.

If sufficient space is present, the appliance drives over a defined distance backwards and then abruptly accelerates forwards (Step 23). If the closure has been successful, the cleaning task is carried out (Step 29). If insufficient space is present for the maneuver, however, the appliance rotates at once in Step 24 and thereby verifies whether its environment has sufficient space for the maneuver in at least one direction around the vacuuming robot.

If insufficient space is present for the maneuver, the appliance initiates a request to the user for the manual closure of the cover element so that the cleaning task can be carried out (Step 28), whereby after the manual closure the cleaning task is continued (Step 29). If sufficient space is present, however, the vacuuming robot orientates itself in the direction with sufficient space and then accelerates abruptly forwards (Step 25). After the successful closure of the cover element, the cleaning task is carried out (Step 29).

If the appliance alternatively establishes that insufficient space is present for the rotation, the appliance feels its way forward slowly by using its bumper in order to verify whether its environment in at least one direction around the vacuuming robot provides sufficient space for the maneuver (Step 26). If sufficient space is present, the vacuuming robot orientates itself in the direction with sufficient space and then accelerates abruptly forwards (Step 27). After the successful closure of the cover element, the cleaning task is carried out (Step 29). If the appliance establishes by using the bumper, however, that insufficient space is present for the maneuver, a request is made to the user to close the cover element manually so that the cleaning task can be carried out (Step 28). After the closure of the cover element, the cleaning task is continued (Step 29).

Through the use of the method according to the invention, the lidar sensor which is already present for the navigation is used in order to identify the open cover element. To this end, advantageously no further additional sensors are required on the cover element. Due to the sensor system being dispensed with, this advantageously reduces the manufacturing cost of the appliance, the complexity of the system and the assembly time. In particular, the appliance itself can detect and independently close an open cover element without the user having to be present and active. This advantageously increases the autonomy of the system.

The invention claimed is:

1. A method for operating a mobile, self-driving appliance or floor cleaning appliance or at least one of a vacuuming, sweeping or mopping robot, the method comprising:
    operating the mobile, self-driving appliance or floor cleaning appliance or at least one of a vacuuming, sweeping or mopping robot;
    using a detection facility provided for navigation to determine whether a cover element disposed on an appliance housing of the mobile, self-driving appliance, is open or closed;
    determining whether the cover element is open or closed by detecting at least one obstacle in a region of the appliance housing and determining a position of the detected obstacle in relation to the cover element; and
    upon the cover element being open, using the mobile, self-driving appliance to perform a driving maneuver for independently closing the cover element.

2. The method according to claim 1, which further comprises performing the driving maneuver independently of a user.

3. The method according to claim 1, which further comprises providing the cover element as a cover flap disposed above a dust collection container to be emptied.

4. The method according to claim 1, which further comprises providing the detection facility as a lidar sensor.

5. The method according to claim 4, which further comprises using a further sensor to determine whether a dust collection container is inserted in the mobile, self-driving appliance.

6. The method according to claim 1, which further comprises taking a tolerance range around the cover element into consideration when determining the position of the detected obstacle in relation to the cover element.

7. The method according to claim 6, which further comprises assigning measuring points of the detection facility within the tolerance range to the cover element, and assigning measuring points of the detection facility outside the tolerance range to other obstacles.

8. The method according to claim 1, which further comprises using an acceleration maneuver of the driving maneuver to introduce a momentum into the cover element causing the cover element to fall shut.

9. The method according to claim 8, which further comprises placing a weight in an upper region of the cover element.

10. The method according to claim 1, which further comprises using the mobile, self-driving appliance to perform a detection of an environment around the mobile, self-driving appliance before carrying out the driving maneuver, to ensure that sufficient space is available for the driving maneuver.

11. The method according to claim 1, which further comprises informing a user at least one of visually or by audio output, about the open cover element.

* * * * *